United States Patent [19]

Hallenbeck

[11] Patent Number: 5,038,211
[45] Date of Patent: Aug. 6, 1991

[54] METHOD AND APPARATUS FOR TRANSMITTING AND RECEIVING TELEVISION PROGRAM INFORMATION

[75] Inventor: Peter D. Hallenbeck, Efland, N.C.

[73] Assignee: The SuperGuide Corporation, Shelby, N.C.

[21] Appl. No.: 375,829

[22] Filed: Jul. 5, 1989

[51] Int. Cl.⁵ ............................................. H04N 7/08
[52] U.S. Cl. ................................... 358/142; 358/146; 358/903
[58] Field of Search ................ 358/142, 146, 147, 84, 358/86, 143, 310, 903; 380/10, 20

[56] References Cited

U.S. PATENT DOCUMENTS

| | | |
|---|---|---|
| 3,440,427 | 4/1969 | Kammer . |
| 3,493,674 | 2/1970 | Houghton . |
| 3,833,757 | 9/1974 | Kirk, Jr. et al. . |
| 3,891,792 | 6/1975 | Kimura . |
| 3,996,583 | 12/1976 | Hutt et al. . |
| 4,016,361 | 4/1977 | Pandey . |
| 4,026,555 | 5/1977 | Kirschner et al. . |
| 4,052,719 | 10/1977 | Hutt et al. . |
| 4,096,524 | 6/1978 | Scott . |
| 4,134,127 | 1/1979 | Campioni . |
| 4,139,860 | 2/1979 | Micic et al. . |
| 4,161,728 | 7/1979 | Insam . |
| 4,170,782 | 10/1979 | Miller . |
| 4,203,130 | 5/1980 | Doumit et al. . |
| 4,205,343 | 5/1980 | Barrett . |
| 4,218,698 | 8/1980 | Bart et al. . |
| 4,231,031 | 10/1980 | Crowther et al. . |
| 4,233,628 | 11/1980 | Ciciora . |
| 4,249,211 | 2/1981 | Baba et al. . |
| 4,261,006 | 4/1981 | Weintraub et al. . |
| 4,264,924 | 4/1981 | Freeman . |
| 4,270,145 | 5/1981 | Farina . |
| 4,288,809 | 9/1981 | Yabe . |
| 4,337,480 | 6/1982 | Bourassin et al. . |
| 4,337,483 | 6/1982 | Guillou . |
| 4,344,090 | 8/1982 | Belisomi et al. . |
| 4,390,901 | 6/1983 | Keiser . |
| 4,412,244 | 10/1983 | Shanley, II . |
| 4,413,281 | 11/1983 | Thonnart . |
| 4,420,769 | 12/1983 | Novak . |
| 4,425,581 | 1/1984 | Schweppe et al. . |
| 4,449,249 | 5/1984 | Price . |
| 4,456,925 | 6/1984 | Skerlos et al. . |
| 4,477,830 | 10/1984 | Lindman et al. . |
| 4,488,179 | 12/1984 | Krüger et al. . |
| 4,495,654 | 1/1985 | Deiss . |
| 4,496,171 | 1/1985 | Cherry . |
| 4,496,976 | 1/1985 | Swanson et al. . |
| 4,547,804 | 10/1985 | Greenberg . |
| 4,566,034 | 1/1986 | Harger et al. . |
| 4,595,951 | 6/1986 | Filliman ............................. 358/142 |
| 4,595,952 | 6/1986 | Filliman ............................. 358/142 |
| 4,620,229 | 10/1986 | Amano et al. . |
| 4,691,351 | 9/1987 | Hayashi ............................. 358/142 |
| 4,694,490 | 9/1987 | Harley ............................... 358/142 |
| 4,707,121 | 11/1987 | Young . |
| 4,751,578 | 6/1988 | Reiter et al. . |
| 4,768,228 | 8/1988 | Clupper ............................... 380/20 |
| 4,908,707 | 3/1990 | Kinghorn ........................ 358/142 X |

FOREIGN PATENT DOCUMENTS

0041121 12/1981 European Pat. Off. ............ 358/142

*Primary Examiner*—Victor R. Kostak
*Attorney, Agent, or Firm*—Bell, Seltzer, Park & Gibson

[57] ABSTRACT

An online television program information system extracts from a broadcast datastream of television program information only that program information for those shows which meet predetermined selection criteria, and stores only the extracted information. By not storing all broadcast television information, memory size for information storage is reduced and a high performance processor is not required for subset searches of the entire stored datastream for programs of interest. A low cost online television program information system is thereby provided, which may store large amounts of useful program information. Content selective storage is facilitated by transmitting and receiving the television program information in three groups, with the first group comprising event data, the second group comprising titles and the third group comprising descriptions.

34 Claims, 6 Drawing Sheets

FIG. 1

GROUP I: EVENTS

| FIELD NAME | FIELD LENGTH (bits) | CONTENTS |
|---|---|---|
| GROUP # | 8 | 00000001 |
| SEQUENCE # | 8 | 00000001-11111111 |
| DAY & TIME | 32 | DAY & TIME OF EVENT |
| SERVICE # | 16 | IDENTIFIER FOR HBO, ABC, ETC. |
| SHOW TYPE | 8 | IDENTIFIER FOR MOVIES, SPORTS, NEWS, ETC. |
| SHOW SUBTYPE | 8 | IDENTIFIER FOR BASKETBALL, BASEBALL, COMEDY, ETC |
| SHOW # | 16 | IDENTIFIER FOR SHOW # |
| TITLE LENGTH | 8 | NUMBER OF BITS IN SHOW TITLE |
| DESCRIPTION LENGTH | 16 | NUMBER OF BITS IN SHOW DESCRIPTION |

GROUP II: TITLES

| FIELD NAME | FIELD LENGTH (bits) | CONTENTS |
|---|---|---|
| GROUP # | 8 | 00000010 |
| SEQUENCE # | 8 | 00000001-11111111 |
| SHOW # | 16 | IDENTIFIER FOR SHOW # |
| TITLE | VARIBLE | COMPLETE TITLE OF SHOW |
| DESCRIPTION # | 16 | IDENTIFIER FOR DESCRIPTION # |
| DESCRIPTION LENGTH | 16 | NUMBER OF BITS OF SHOW DESCRIPTION |

GROUP III: DESCRIPTIONS

| FIELD NAME | FIELD LENGTH (bits) | CONTENTS |
|---|---|---|
| GROUP # | 8 | 00000010 |
| SEQUENCE # | 8 | 00000001-11111111 |
| DESCRIPTION # | 16 | IDENTIFIER FOR DESCRIPTION # |
| DESCRIPTION | VARIABLE | COMPLETE DESCRIPTION OF SHOW |

*FIG. 2*

MEMORY MAP DURING THE DOWNLOAD PROCESS

METHOD AND APPARATUS FOR TRANSMITTING AND RECEIVING TELEVISION PROGRAM INFORMATION

FIELD OF THE INVENTION

This invention relates to television (TV) program schedule guides and in particular to a method and apparatus for efficiently transmitting, receiving and storing television program schedule information.

BACKGROUND OF THE INVENTION

The cable TV and satellite TV industries have long needed an online program guide. An online program guide would be broadcast over a satellite or cable system, and the received program information would be stored in a satellite receiver, cable TV decoder or other unit. An online system would eliminate paper TV guides, which are difficult to distribute and often inaccurate because of last minute changes in TV programming. Moreover, with the availability hundreds or thousands of TV reception channels for satellite TV, paper guides have become bulky and difficult to use.

An online TV program information system would allow storage of up-to-date information for many services, and may provide searching capabilities for the stored TV schedule information, so that only desired channels, services or types of programming are selected. The TV program information may be displayed on the TV to allow searching and viewing. See for example U.S. Pat. No. 4,751,578 to Reiter et al. entitled *System For Electronically Controllably Viewing On A Television Updatable Television Programming Information*, in which TV programming information is stored, under microcomputer control, and a remote control system permits the viewer to direct the microcontroller to perform searches on stored information to provide subsets of information desired by the viewer.

Another known advantage of an online TV schedule system is the ability of the selected TV program information to control a video cassette recorder (VCR) or satellite reception antenna. For example, one week of programs may be selected for future viewing. At the selected times the TV may be turned on and tuned to the proper channel, a VCR may be activated for recording or a satellite dish may be aimed and tuned for proper reception. See for example U.S. Pat. No. 4,706,121 to Young entitled TV Schedule System and Process, in which a system controls a TV to allow user selection of broadcast programs from schedule information which is received from an FM receiver under system control. User inputs are supplied and a data processor selects programs from the schedule information based on the user inputs. A programmable VCR may be controlled by the data processor based on the user inputs.

Notwithstanding the above described advantages and long felt need, a large scale online TV program system has not heretofore been commercialized, primarily because of economic considerations. The unit for receiving and storing online TV schedule information (whether freestanding or included in other devices) must be inexpensive to produce and sell. However, in order for such a unit to be useful, at least a few days and preferably at least a week or more of schedule information must be stored therein. For a satellite TV system, one week of information may consist of 10,000 distinct events (i.e. a unique show at a unique time) including 2,000 different shows. An inordinate amount of memory is required to store this much information, including necessary descriptions of the shows. Moreover, in order to efficiently process this much information, for example for program searching, high speed processors are required.

The combination of high performance processors and large memory requirements have made the devices prohibitively expensive. A system which included sufficient processing power and memory to store a critical amount of TV schedule information was too expensive to gain widespread acceptance, while an affordable system could not store enough schedule information to be useful. This situation has not improved as the cost of processors and memory have decreased, because the ever increasing number of available TV services has required ever increasing amounts of memory and higher processor speeds for the TV program information.

SUMMARY OF THE INVENTION

It is therefore an object of the invention to provide a method and apparatus for transmitting, receiving and storing television program information.

It is another object of the invention to provide an online TV program information system and process which is capable of storing a sufficient amount of TV scheduling information to be useful.

It is yet another object of the invention to provide an online TV program information system and method in which a critical amount of TV information may be stored using minimal memory and processor requirements.

It is yet a further object of the invention to provide a method and apparatus for transmitting and receiving television program information which is economically competitive with paper TV guides.

These and other objects are provided by an online television program information system which extracts from a broadcast datastream only that program information which is required, based upon a comparison with predetermined selection criteria stored in the system. In other words, a content-selective reception system is provided. Rather than storing all received TV schedule information, and providing massive subset searching in the receiver, the present system discards incoming information which is not desired. For example, if a user does not subscribe to a particular TV service or has elected not to view certain types of TV programs, this program information is not stored in the system.

According to the invention, many days of useful program information may be stored in a minimal amount of memory. Viewed in another way, for a predetermined amount of memory much useful TV information may be stored, compared with a system which stores all broadcast information. Moreover, since unwanted information is discarded and not stored, subset searching is simplified or eliminated, so that less powerful processors may be employed than heretofore possible. In fact, the present invention may eliminate most if not all subset searching, since the only information stored in the system is that information which already meets predetermined selection criteria.

According to another aspect of the invention, content selective reception of TV program information is facilitated, while allowing all of the available memory to be used for storing TV program information, by transmitting the TV program information in three groups. The first group (Group I) includes an identification of each event by day and time, TV service, type of show and an indication of the length of the show title and length of the show description. The second group (Group II) includes a show identification and the full title of each show. The third group (Group III) includes a show identification and the full description of each show. All the Group I information is broadcast followed by the Group II information followed by the Group III information.

According to the invention, as each packet of Group I information for each event is received, the system compares the data with stored criteria and determines whether this event is to be stored or discarded, and if stored, whether a description is desired. After the Group I information is transmitted, Group II information is transmitted. The system stores Group II information only for Group I events which have been previously stored. Similarly, for Group III information, only those descriptions for events which have been preselected are stored.

Since the Group I information includes an indication of the title and description length, the system may calculate the amount of memory required to store all the desired information. All of the requested event identifications will be stored as will all of the titles for the shows. The descriptions for these shows will be stored until the memory has been filled, beginning with the present (and most useful) descriptions.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiment set forth herein; rather, applicant provides this embodiment so that this disclosure will be thorough and complete, and will fully convey the scope of the invention to those skilled in the art. Like numbers refer to like elements throughout.

Figure 1:
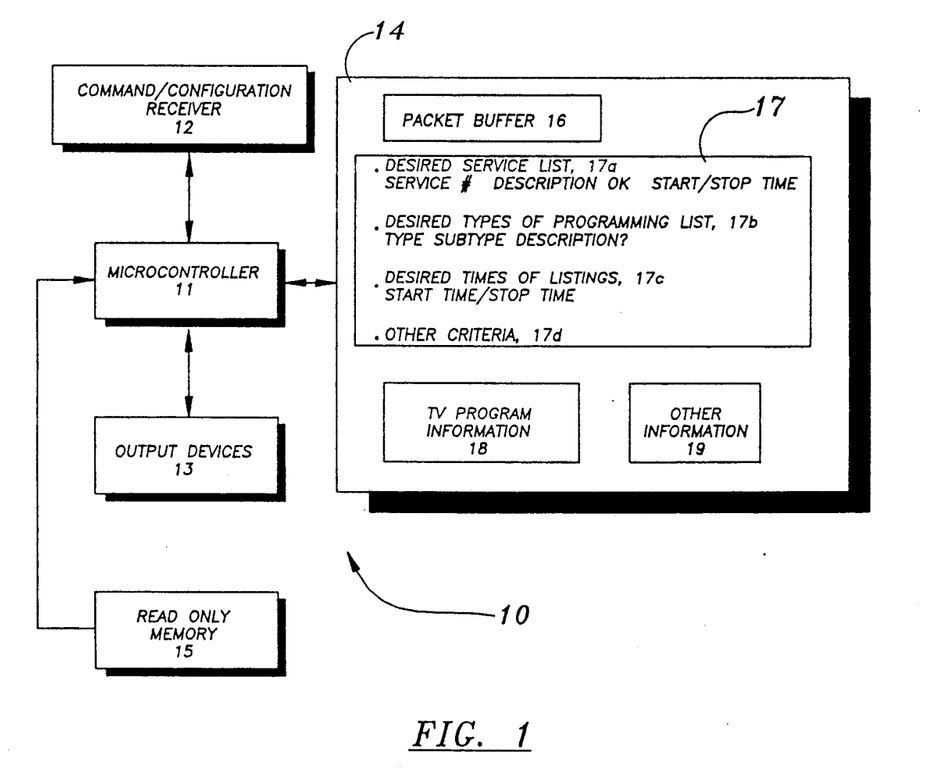
FIG. 1 is a block diagram of a TV schedule information receiver according to the present invention.

Referring now to FIG. 1 a block diagram of a TV schedule reception system according to the present invention will be described. The system 10 comprises a microcontroller 11 which may be a MC68000 microprocessor manufactured by Motorola. Microcontroller 11 may operate under control of a stored program which may be included in a Read Only Memory 15. Connected to microcontroller 11 is a command/configuration receiver 12 which may be a receiver for an infrared controller, a keyboard, an IEEE Consumer Electronics bus or other known means for enabling a user to provide commands or configuration information to the microcontroller 11. Similarly, one or more output devices 13 may be coupled to microcontroller 11. These output devices may be, for example, an IEEE Consumer Electronics bus, a serial port for communicating with other devices, a video signal output and/or infrared output for communicating with a TV screen or monitor. The design and integration of blocks 11, 12, 13 and 15 are well known and will not be described further.

Also associated in system 10 is a random access memory 14, for storing TV program information according to the present invention. In particular, random access memory 14 may include a packet buffer 16 in which a packet of broadcast program information may be stored pending a determination whether to permanently store the information in TV program information memory 18 or whether to discard this information. Also included in memory 14 is a selection criteria list 17 which includes predetermined selection criteria for determining whether the broadcast information in packet buffer 16 should be stored in TV program information memory 18 or discarded. In one embodiment, the selection criteria 17 may include a desired service list 17a, a desired types of programming list 17b, desired times of listings 17c and other criteria 17d.

The desired service list 17a may be automatically configured by the system to include only those services which the particular user may receive. For example, the user may not subscribe to all available pay TV services or may not have the satellite or cable equipment to receive all possible free TV services. The user may also be provided with means, for example in the form of on-screen prompts, for configuring the desired service list 17a according to his own specifications. The desired service list 17a may include a listing of service numbers, whether descriptions of TV programs are desired for that service and desired start and stop times of the programs for that service. Thus for example, a user may program ESPN, with descriptions, for 8 p.m. to midnight only.

A second type of selection criteria may be found in the desired types of programming list 17b. In this list selected types and subtypes of programs may be stored. One type of program might be sports, and a subtype might be basketball. Also stored is an indication of whether descriptions are desired. Yet another type of selection criteria might be the desired times of listings 17c. For example, if a user is only at home in the evening he may only wish to view listings from 6 p.m. to 11 p.m. Other criteria 17d may also be selected or provided.

Random access memory 14 may also include an area 18 for TV programming information. Area 18 contains all the TV schedule information which has been retained by the system. According to the invention, and as will be described in detail below, this memory will always be filled with TV program data, regardless of its size. Storage areas for other information 19 may also be provided. This storage area may include other software or other data.

It will be recognized by those having skill in the art that system 10 may be a standalone unit or may be integrated with a cable TV converter, satellite receiver, VCR or other microprocessor controlled electronic unit so that other programs may also reside in random access memory 14. It will also be understood by those having skill in the art that areas 16-19 may be provided in programmable read only memory, electrically erasable memory or other types of memory or may be stored on magnetic or optical storage media according to well known techniques. Similarly, control programs may be stored on magnetic or optical media or other forms of memory rather than read only memory 15.

Figure 2:
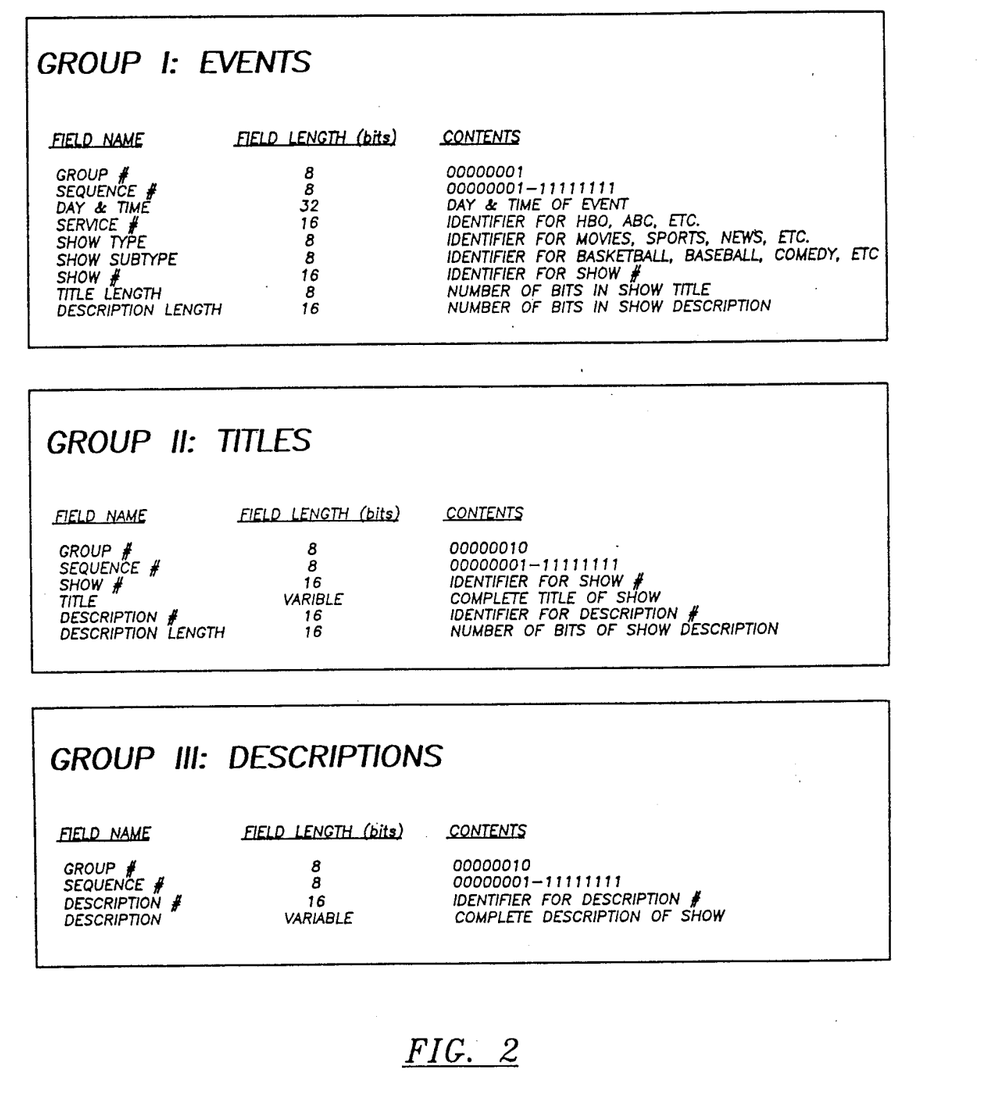
FIG. 2 is a simplified representation of a transmission format for TV schedule information according to the present invention.

Referring now to FIG. 2 a transmission format according to the present invention will now be described. This information may be broadcast over a predetermined satellite or cable TV channel, or any other transmission medium continuously or at predetermined times. It may also be transmitted by physical distribution of magnetic, optical or other media. The TV program information is transmitted and received in three groups. All of the Group I data is transmitted followed by all of the Group II data followed by all of the Group III data. It will be seen that the receiver selectively loads desired information from each group as it is received. Information loaded from previous groups may affect the information loaded during a subsequent stage.

Referring now to FIG. 2 each Group I data packet may begin with an indication of group number (i.e. Group I) and a sequence number which identifies sequential packet numbers within Group I. Then, the day and time of an event may be provided and an identification number for the service may be provided. The service may be, for example, HBO, ABC, or a local TV channel. Next, an indication of the show type, for example movie or sports may be provided, and an indication of the show subtype, for example basketball, baseball or hockey may be provided. A unique show number identifier is provided. This show number identifies a particular program for example, the movie "Ghandi". It will be understood that the number of events far exceeds the number of shows because each show may be broadcast multiple times by multiple services. Thus, for example, a Group I transmission may include 10,000 events but only 2,000 shows having unique titles. Only 800 of those shows may include unique descriptions. An indication of the length of the show title and an indication of the length of the show description are also provided as part of each Group I packet. FIG. 2 illustrates the above described field names and contents and example field lengths for each field.

Following all the Group I, information the Group II information is provided. The Group II information may also include an indication of the group number (i.e. II) and a sequence number. The primary information stored in Group II is the title information. Thus, Group II includes a show number field and includes a complete title of variable length. The description number and description length, as described for Group I is also included. Finally, the Group III information includes group number (III) and sequence number, the description number and the variable length description.

The storing of transmitted TV program information in TV program information memOry 18 (FIG. 1) according to the invention will now be described. Prior to describing this process in detail a few general concepts will be presented. It has already been described that Group I data is transmitted in terms of events. The Group I data is also transmitted in time sequence with present events being transmitted before future events. Accordingly, when the system runs out of memory space, the most present data will have been loaded. As an event is received, the decision to load an event may be based on whether there is room in memory for it, whether it is the type and subtype of event desired and whether the service is a desired service. If an event is loaded (Group I), the corresponding title for the event is always loaded. After the titles for the desired events are loaded the decision to load an event's description may be based upon whether there is room for the description, whether the event has already been loaded and whether descriptions are desired for that type and subtype of event. It will also be understood by those having skill in the art that after downloading, the shows and times may be sorted by type, or by other criteria, so that the types of shows desired may be viewed without further subset searches.

Figures 3A, 3B:
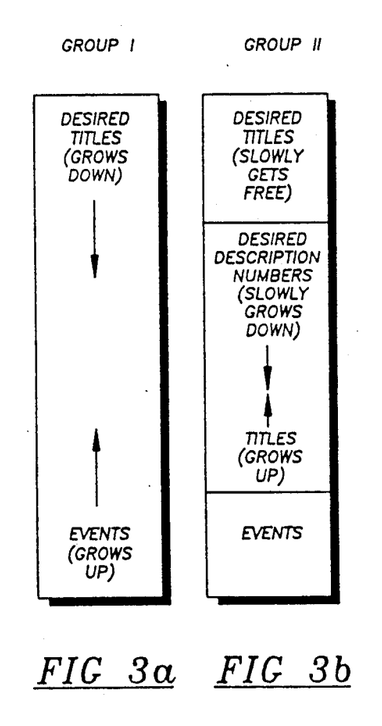
FIGS. 3a-3e are a schematic representation of the contents of the TV program information memory of FIG. 1 at various stages during a reception process according to the present invention.
Figure 3C:
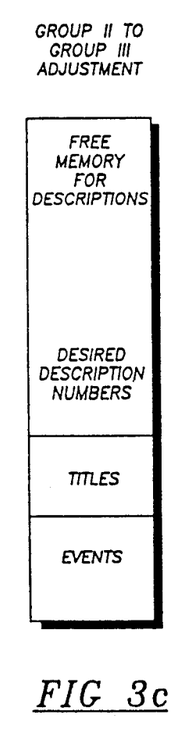
Figure 3D:
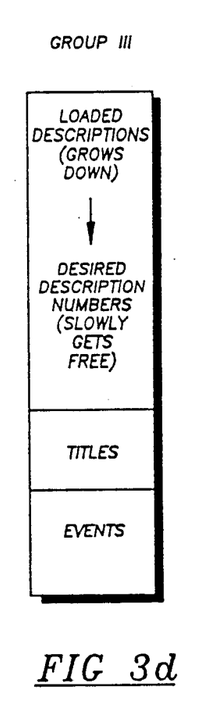
Figure 3E:
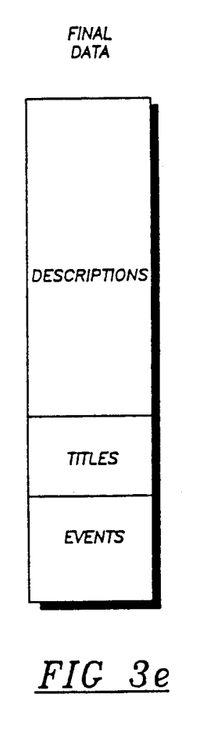
Figure 4A:
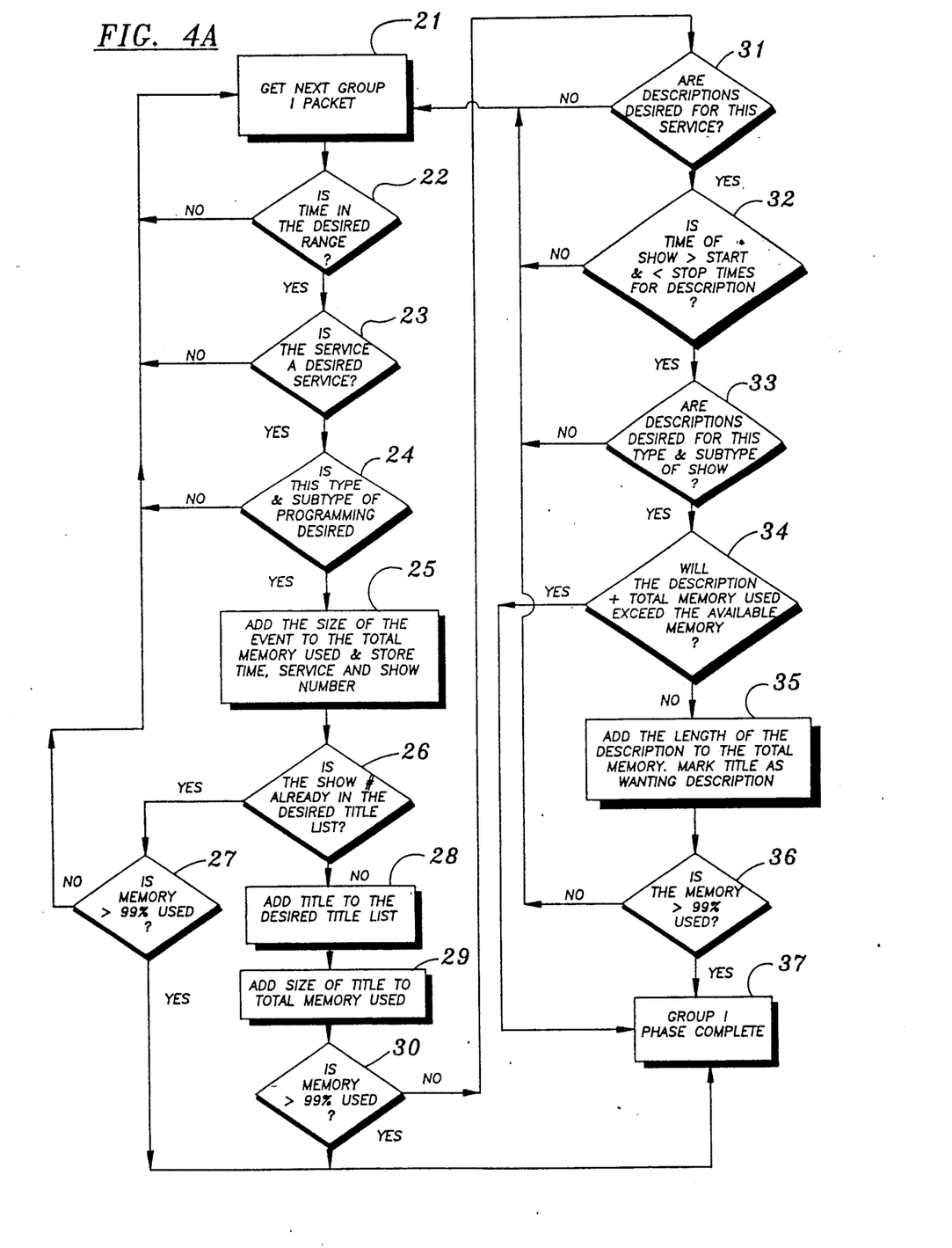
FIGS. 4a-4c are a block flow diagram illustrating the logic and sequence of operations for storing broadcast TV program information according to the present invention.
Figure 4B:
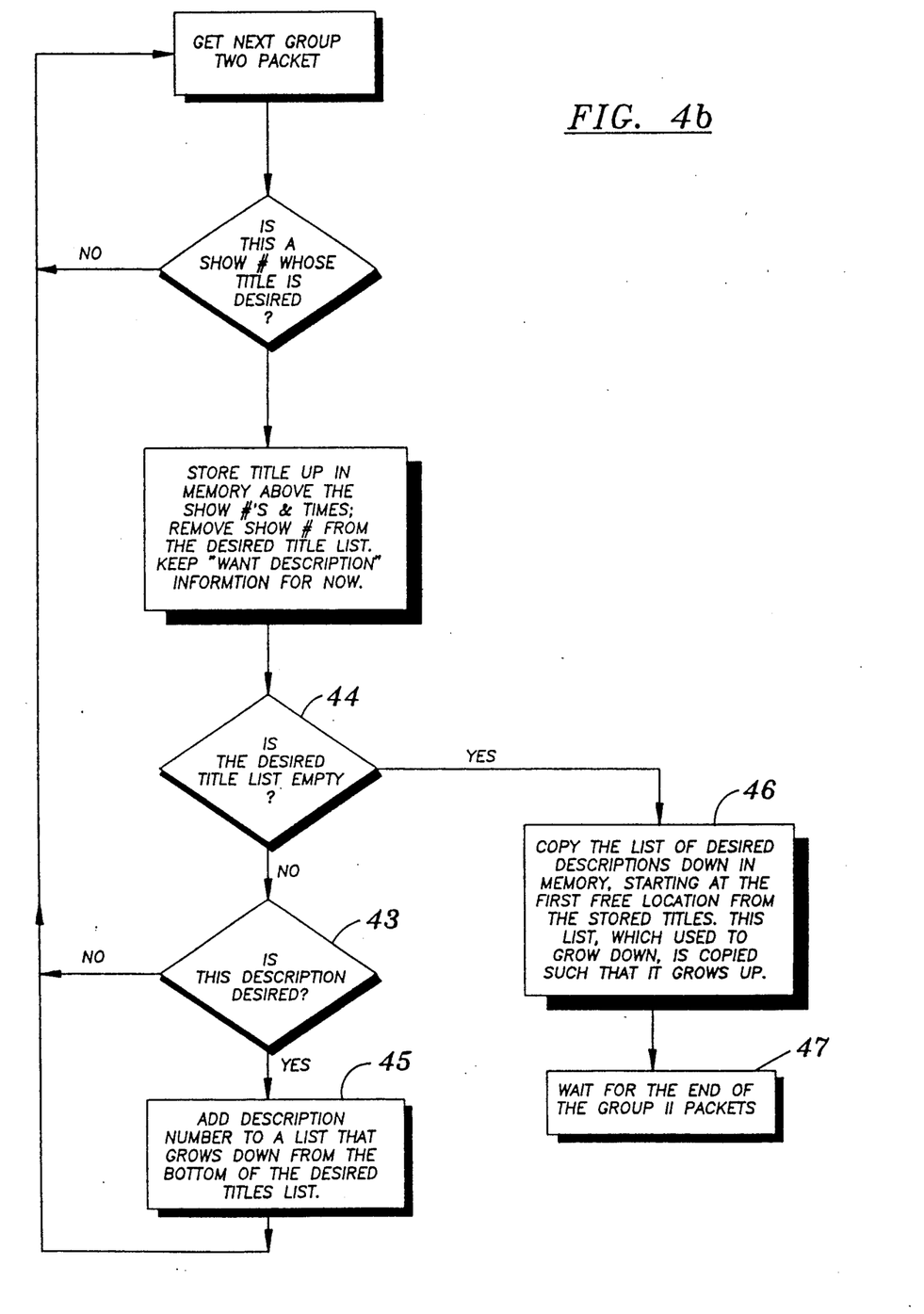
Figure 4C:
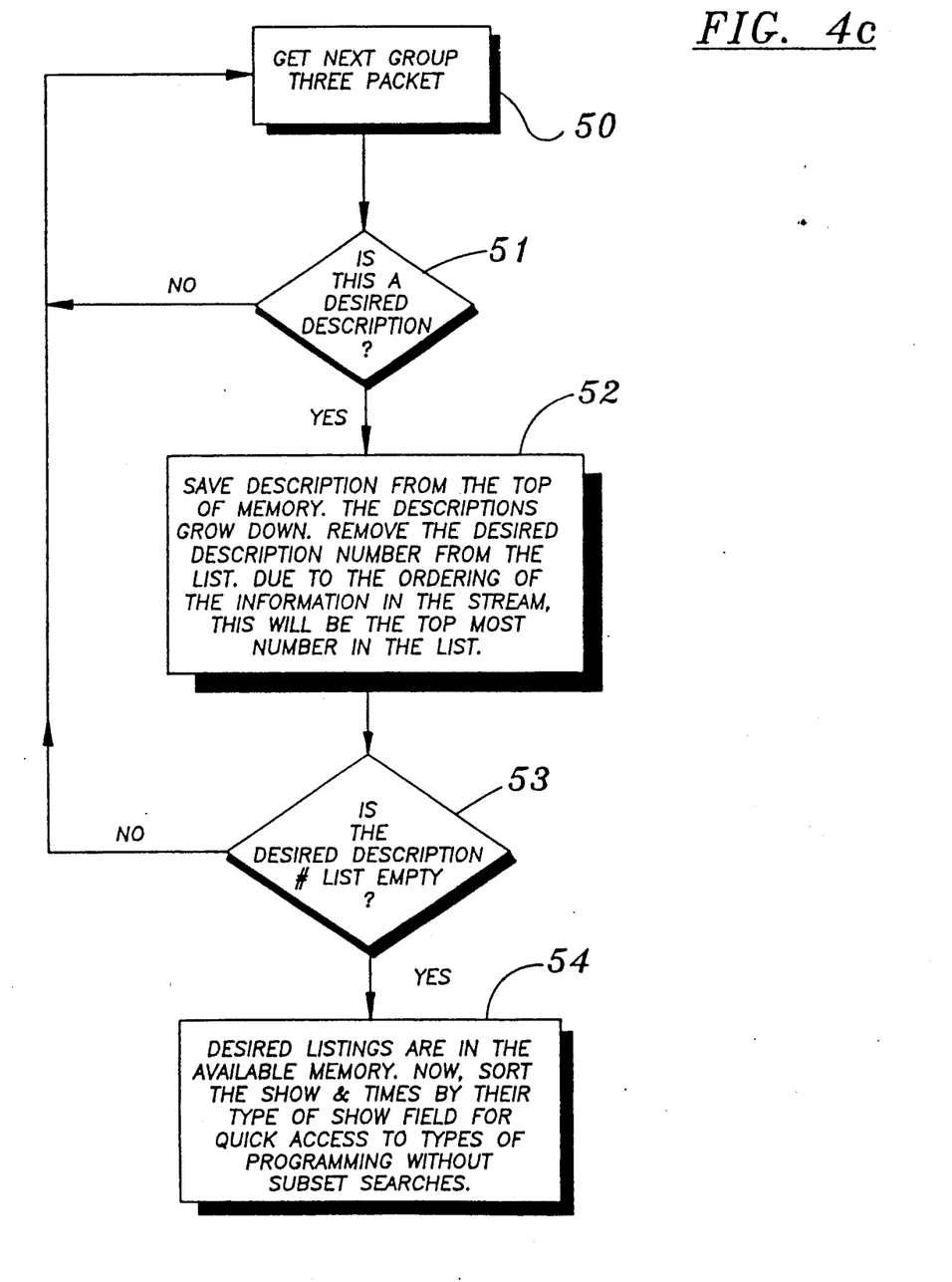

Referring now to FIGS. 3 and 4, the selective storage of TV program information according to the present invention will now be described. In this regard, FIGS. 4a, 4b and 4c describe the operations for processing each packet in Groups I, II and III respectively. FIGS. 3a-3e illustrate a memory map for TV program information memory area 18 within random access memory 14 at various steps in FIG. 4.

Referring now to FIG. 4a, the reception of Group I packets will be described. A Group I packet is received in packet buffer 16 (block 21). The day and time field is scanned to determine whether the time is in the desired time range stored in portion 17c of memory 14 (block 22). If not, processing returns to get the next Group I packet (block 21) and the present Group I packet is not stored. If time is in the desired range, then a test is made (block 23) of the service number field, to determine whether the service number is a desired service as stored in portion 17a of memory 14. If yes, a test is made as to the type and subtype of programming desired (block 24). If all the tests (blocks 22-24) pass, then at block 25 the size of the event (i.e. the title length and description length) is added to the total memory used and the time, service and show number is stored in the events list of memory 18.

Referring to FIG. 3a, it may be seen that the show number, service number, and times are stored in an events list at the bottom of TV program information memory 18. It will also be understood that in each Group I packet only the date and time, service number, show type and subtype and show number are saved in the memory. The title length and the description length are merely added to the total memory used.

Referring again to FIG. 4a a test is made (block 26) as to whether the show number is already in the desired title list. If not, then this title is added to the desired title list (block 28) from the top of the memory, growing downward. The length of the title is added to the total amount of memory used (block 29). If the sum indicates that the memory will now be over 99% used (block 30) then no further Group I packets are stored (block 37). On the other hand if there is still available room in the memory, then a test is made as to whether descriptions are desired for this service (block 31) based on the information stored in area 17a. A further test is made (block 32) as to whether the time of the show is between the start and stop times (area 17c) for which descriptions are required. Yet a further test is made to see if descriptions are desired (area 17b) for this type and subtype of show (block 33).

If these answer to any of these tests is no, then processing returns to accept the next Group I packet (block 1). If the answer to any of these tests is yes, a test is made as to whether the description and total memory already needed exceeds the available memory (block 34). If yes, then no further Group I processing is permitted (block 37). If no, (block 35) the length of this description is added to the total memory used and the title is marked as requiring a description (block 35). If memory is now more than 99% used, then no further Group I packets are accepted (block 37). On the other hand, if further memory is available then the next Group I packet is obtained (block 21).

Group II processing will now be described in connection with FIGS. 4b and 3b. Referring now to FIG. 4b a first Group II packet is obtained (block 40). Then a test is made as to whether the show number is a show number whose title is desired (block 41). If yes, then the title is stored in the memory 18 above the show numbers and times as shown in FIG. 3b. The show number is removed from the desired title list. However, the "want description" designation is maintained. Thus, the desired title information slowly becomes free.

Then, at block 44 a test is performed as to whether the desired title list is empty. If not, then a test is performed as to whether the description is desired (block 43). If the description is not desired, the next Group II packet is obtained (block 40). If the description is desired, then the description number is added to a list which grows down from the bottom of the described title's list (See FIG. 3b) and the next Group II packet is obtained (block 40).

If the desired title list is empty, then no further titles need to be obtained and the memory is reordered as shown in FIG. 3c. The show numbers, show times and titles remain as they were in FIG. 3b. The desired description numbers are moved adjacent the titles in reverse order. Accordingly, the lower order portion of the memory is now free for the descriptions. See block 46 of FIG. 4b. Then, at block 47, processing waits until the end of the Group II packet transmission.

Referring now to FIG. 4c, the first Group III packet is received (block 50), and a test is made as to whether this is a desired description (block 51). If not, the next Group III packet is received. If yes, then this description is stored at the top of memory 18 (See FIG. 3d); i.e., the descriptions grow down. The desired description number is removed from the description list. Due to the ordering of the information in the transmission, this will be the topmost number in the list. Then, at block 53 a test is made as to whether the desired description list is empty. If not, then the next Group III packet is obtained. If yes, then all the desired listings are in the available memory. The final layout of program information in memory 18 is shown in FIG. 3e.

It will be understood by those having skill in the art that the transmission and reception process of the present invention ensures that the available memory, regardless of its size, is always filled with program information. Moreover, all of the desired show numbers, times and titles are obtained, whereas only those descriptions which fill up the remainder of the memory are obtained. Thus, the most useful information is obtained. When the final data is obtained as shown in FIG. 3e, the show numbers and times in the events list may be sorted by the type of show field so that quick access for various types of programming may be obtained without the need of subset searches (See block 54). This obviates the need for extensive subset searching of the final data and reduces processor overhead and response time.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An online television program schedule system comprising:

first means for storing at least one of a desired program start time, a desired program end time, a desired program service, and a desired program type;

means for receiving television program schedule information, said television program schedule information comprising at least one of program start time, program end time, program service, and program type for a plurality of television programs;

second storing means, connected to said first storing means and said receiving means, for storing selected portions of received television program schedule information which meet at least one of the desired program start time, the desired program end time, the desired program service, and the desired program type; and displaying means, operatively connected to said second storing means, for displaying at least part of the selected portions of received television program schedule information to thereby provide an online television program schedule.

2. The online television program schedule system of claim 1 wherein said receiving means comprises means for sequentially receiving packets of television program schedule information.

3. The online television program schedule system of claim 1 wherein said second storing means comprises;

means for comparing the received television program schedule information with the stored at least one of a desired program start time, a desired program and time, a desired program service, and a desired program type; and means for storing the received television program schedule information which meets said stored at least one of a desired program start time, a desired program and time, a desired program service, and a desired program type.

4. An online television program schedule system comprising:

means for storing at least one of a desired program start time, a desired program end time, a desired program service, and a desired program type;

means for receiving a television program schedule information datastream, said datastream comprising at least one of program start time, program end time, program service, and program type for a plurality of television programs;

means for extracting from said television program schedule information datastream, television programming information which meets at least one of the desired program start time, the desired program end time, the desired program service, and the desired program type;

means for storing the extracted television program schedule information; and means for displaying at least some of the extracted television program schedule information to thereby provide an online television program schedule.

5. A method for providing an online television program schedule comprising the steps of:

storing at least one of a desired program start time, a desired program end time, a desired program service, and a desired program type;

sequentially receiving packets of television program schedule information comprising at least one of program start time, program end time, program service, and program type for a plurality of television programs;

storing selected portions of the received packets of television program information which meet at least one of the desired program start time, the desired program end time, the desired program service, and the desired program; and displaying at least part of the stored selected portions of the received packets of television program information to thereby provide an online television program schedule.

6. The method of claim 5 wherein said storing selected portions of the received packets of television information step comprises the steps of:

comparing information in a received packet of television information with at least one of the desired program start time, the desired program end time, the desired program service, and the desired program type; and storing information from the received packet of television information which meets at least one of the desired program start time, the desired program end time, the desired program service, and the desired program type.

7. A method for providing an online television program schedule comprising the steps of:

storing at least one of a desired program start time, a desired program end time, a desired program service, and a desired program type;

serially receiving a television program schedule information datastream comprising at least one of program start time, program end time, program service, and program type for a plurality of television programs;

extracting from said television program schedule information datastream, television program information which meets at least one of the desired program start time, the desired program end time, the desired program service, and the desired program type;

storing the extracted television program schedule information; and displaying at least part of the stored extracted television program schedule information to thereby provide an online television program schedule.

8. Apparatus for transmitting television program information comprising:

means for transmitting a first group of television program information packets for a plurality of television program events, said packets in said first group comprising an identification of the date and time of a television program event, an identification of the service providing the event, an identification of the type of show and an identification number for a show, and excluding a show title; and means for subsequently transmitting a second group of television program information packets for a plurality of television program shows, said packets in said second group comprising an identification number for a show and a show title, and excluding an identification of the date and time of a television program event, an identification of the service providing the event and an identification of the type of show.

9. The apparatus of claim 8 wherein said packets in said second group further comprise an identification number for a show description; said apparatus further comprising means for serially transmitting a third group of television program information packets for a plurality of television program shows, said packets in said third group comprising an identification number for a show description and a show description; and excluding an identification of the date and time of a television program event, an identification of the service providing the event, an identification of the type of show and a show title.

10. The apparatus of claim 9 wherein said packets in said first group further comprise the length of the associated show title and the length of the associated show description.

11. A method of transmitting television program information comprising the steps of:

transmitting a first group of television program information packets for a plurality of television program events, said packets in said first group comprising an identification of the date and time of a television program event, an identification of the service providing the event, an identification of the type of show and identification number for a show, and excluding a show title; and subsequently transmitting a second group of television program information packets for a plurality of television program shows, said packets in said second group comprising an identification number for a show and a show title, and excluding an identification of the date and time of a television program event, an identification of the service providing the event and an identification of the type of show.

12. The method of claim 11 wherein said packets in said second group further comprise an identification number for a show description; and method further comprising the step of subsequently transmitting a third group of television program information packets for a plurality of television program shows, said packets in said third group comprising an identification number for a show description and a show description; and excluding an identification of the date and time of a television program event, an identification of the service providing the event, an identification of the type of show and a show title.

13. The method of claim 12 wherein said first type television program information packets further comprise indicators of the length of the associated show title and the associated show description.

14. A television program information transmission format comprising:

a plurality of group one television program information packets, each group one packet comprising information about a unique television program event, including the date and time of said event, the service providing said event, the show type for said event and the show number for said event, and excluding a show title; followed by a plurality of group two television program information packets following said group one packets, each group two packet comprising information about a unique television program show, including the show number and the title of said show, and excluding an identification of the date and time of a television program event, an identification of the service providing the event and an identification of the type of show.

15. The television program information format of claim 14 wherein said group two television program information packets further comprise a description number for a description associated with said show; and wherein said plurality of group two television program information packets are followed by a plurality of group three television program information packets following said second type packets, each group three packet comprising a description number for a show and a description of said show; and excluding an identification of the date and time of a television program event, an identification of the service providing the event, an identification of the type of show and a show title.

16. The television program information format of claim 14 wherein said group one packets further comprise indicators of the lengths of the title and the lengths of the description associated with said show.

17. A television program information transmission format comprising:
   a plurality of group one television program information packets, each group one packet comprising information about a unique television program event, including the date and time of said event, the service providing said event, the show type for said event and the show number for said event; followed by
   a plurality of group two television program information packets following said group one packets, each group two packet comprising information about a unique television program show, including the show number and the title of said show; said group two television program information packets further comprising a description number for a description associated with said show; followed by
   a plurality of group three television program information packets following said second type packets, each group three packet comprising a description number for a show and a description of said show.
   wherein said group one of packets are each of a first predetermined length and wherein said group two and group three packets are of variable length.

18. Apparatus for producing an online television program schedule comprising:
   a packet buffer for sequentially receiving packets of said television program information comprising at least one of program start time, program end time, program service, and program type for a plurality of television programs;
   a list containing at least one of a desired program start time, a desired program end time, a desired program service, and a desired program type for retaining a received packet of television program information;
   television program information storage means;
   means for comparing information in said received packet of television program information against at least one of the desired program start time, the desired program end time, the desired program service, and the desired program type in said list, and for storing information from said received packet of television program information in said television program information storage means if the compared information meets at least one of the desired program start time, the desired program end time, the desired program service, and the desired program type; and
   means for displaying at least some of the stored information which meets the at least one of the desired program start time, the desired program end time, the desired program service and the desired program type; to thereby produce an online television program schedule.

19. The apparatus of claim 18 further comprising a command/configuration receiver for receiving user selections of the at least one of a desired program start time, a desired program end time, a desired program service, and a desired program type and storing said the at least one of a desired program start time, a desired program end time, a desired program service, and a desired program type in said list.

20. The apparatus of claim 19 wherein said command/configuration receiver includes a remote control unit.

21. The apparatus of claim 18 wherein said displaying means comprises a monitor screen.

22. The apparatus of claim 18 in combination with a video cassette recorder.

23. The apparatus of claim 18 in combination with a satellite television receiver.

24. The apparatus of claim 18 in combination with a cable television converter.

25. The apparatus of claim 18 wherein said means for comparing and storing comprises a stored program microcomputer.

26. A method of providing an online television program schedule comprising the steps of:
   receiving group one packets of television program information, each of said group one packets identifying a unique television program event and comprising a day and time of said event, a service number, a show type, a show number identifying the television show corresponding to said event, the length of the title of said corresponding show and the length of the description of said corresponding show;
   for each received group one packet of television program information, comparing said packet to at least one of a desired time range, desired service and desired type of program;
   if the received group one packet of television program information corresponds to at least one of the desired time range, desired service and desired type of program, storing at least said day and time of said event, said service number and said show number and
   displaying the stored at least said day and time of said event, said service number and said show number to thereby provide an online television program schedule.

27. The method of claim 26 wherein said storing step comprises the step of:
   storing said day and time, said service number and said number identifying the television show in an events list and storing said show number in a desired titles list.

28. A method of receiving television program information comprising the steps of:
   receiving group one packets of television program information, each of said group one packets identifying a unique television program event and comprising a day and time of said event, a service number, a show type, a show number identifying the television show corresponding to said event, the length of the title of said corresponding show and the length of the description of said corresponding show;

for each received group one packet of television program information, comparing said packet to at least one of a desired time range, desired service and desired type of program;

if the received group one packet of television program information corresponds to at least one of the desired time range, desired service and desired type of program, storing at least said day and time of said event, said service number and said show number; and if the received group one packet of television program information corresponds to said at least one of the desired time range, desired service and desired type of program, adding the length of the title of said corresponding show to the total amount of storage used, determining whether a description is desired and, if desired, adding the length of the description to the total amount of storage used and providing an indication that a description is desired for the corresponding show.

29. A method of receiving television program information comprising the steps of:

receiving group one packets of television program information, each of said group one packets identifying a unique television program event and comprising a day and time of said event, a service number, a show type, a show number identifying the television show corresponding to said event, the length of the title of said corresponding show and the length of the description of said corresponding show;

for each received group one packet of television program information, comparing said packet to at least one of a desired time range, desired service and desired type of program;

if the received group one packet of television program information corresponds to at least one of the desired time range, desired service and desired type of program, storing said day and time of said event, said service number and said show number, in an events list and storing said show number in a desired titles list;

receiving group two packets of television program information, each of said group two packets comprising a show number and a title corresponding to said show number, a description number and a description length corresponding to said show number; and for each received second type packet of television information, determining whether the received show number is in the desired titles list; and if said received show number is in the desired titles list, storing said titles, determining whether a description is desired, and if desired, storing said description number in a desired description list.

30. The method of claim 29 further comprising the steps of:

receiving group three packets of television program information, each of said group three packets comprising a description number and a description corresponding to said description number;

for each received group three packet of television program information, determining whether the received description number is in the desired description list; and if said received description number is in the desired description list, storing the corresponding description.

31. The method of claim 30 wherein the step of storing at least said day and time of said event, said service number and said show number comprises the step of storing said day and time of said event, said service number, said show number and the type of show; and wherein said method further comprises the step of: sorting the stored day and time of said events, said service numbers, said show numbers and the types of show according to the type of show.

32. In a television program information receiving apparatus comprising a packet buffer for receiving packets of television program information and a television program information memory for storing therein information from selected ones of the received packets of television program information, a method of storing said information from said selected ones of the received packets of television program information in said television program information memory comprising the steps of:

storing an event time and date, service number and show number from packets of television program information which meet at least one of a desired event time and date, a desired event service number, and a desired event show number in an events list in said television program information memory;

storing title numbers corresponding to events stored in said events list in a desired titles list in said television program information memory;

storing description numbers corresponding to selected ones of the events stored in said events list in a desired description list in said television program information memory;

storing titles corresponding to said title numbers in a titles list and removing the corresponding title number from said desired titles list; and storing descriptions corresponding to said description numbers in a descriptions list and removing the corresponding description number for said desired descriptions list.

33. Apparatus for receiving television program information comprising:

a packet buffer for sequentially receiving packets of television program information for a plurality of television events, each event comprising a television show provided by a unique television service at a unique time;

a list containing at least one of a desired event start time, a desired event end time, and a desired event service;

television program information storage means; and means for comparing information in said received packet of television program information against said list and for storing information from said received packet of television program information if the compared information meets at least one of the desired event start time, the desired event end time, and the desired event service;

said television program information storage means comprising first, second and third areas;

said first area comprising at least one of the desired event start time, the desired event end time, and the desired event service for some of said plurality of television events;

said second area comprising titles of a least some television shows represented by said at least some of said plurality of television events;

said third area comprising descriptions of a least some of said plurality of television events.

34. The apparatus of claim 33 wherein said second area comprises titles of all of the televisions shows represented by said at least some of said plurality of television events.

* * * * *

UNITED STATES PATENT AND TRADEMARK OFFICE
CERTIFICATE OF CORRECTION

PATENT NO. : 5,038,211
DATED : August 6, 1991
INVENTOR(S) : Hallenbeck

It is certified that error appears in the above-identified patent and that said Letters Patent is hereby corrected as shown below:

Column 4, line 18, please delete "Whether" and substitute --whether-- therefor.

Column 5, line 57, please delete "memOry" and substitute --memory-- therefor.

Column 6, line 65, please delete "1)" and substitute --21)-- therefor.

Column 10, line 27, after "and" (first occurrence), please insert --an--.

Signed and Sealed this

Twelfth Day of October, 1993

Attest:

BRUCE LEHMAN

Attesting Officer

Commissioner of Patents and Trademarks